(12) United States Patent
Gotmukle et al.

(10) Patent No.: US 12,098,321 B1
(45) Date of Patent: Sep. 24, 2024

(54) ACTIVE FILTER CAKE COMPONENT FOR RESERVOIR DRILL-IN FLUIDS TO ELIMINATE ACID TREATMENT

(71) Applicant: Halliburton Energy Services, Inc., Houston, TX (US)

(72) Inventors: Sharad Bhimrao Gotmukle, Pune (IN); Mahesh Vijay Biyani, Pune (IN); Nivika Rajendra Gupta, Pune (IN); Sunita S. Kadam, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/225,883

(22) Filed: Jul. 25, 2023

(51) Int. Cl.
*E21B 21/00* (2006.01)
*C09K 8/08* (2006.01)

(52) U.S. Cl.
CPC .............. *C09K 8/08* (2013.01); *E21B 21/003* (2013.01); *C09K 2208/18* (2013.01)

(58) Field of Classification Search
None
See application file for complete search history.

(56) References Cited

U.S. PATENT DOCUMENTS

| | | |
|---|---|---|
| 5,106,516 A | 4/1992 | Mueller et al. |
| 5,403,822 A | 4/1995 | Mueller et al. |
| 6,596,670 B1 | 7/2003 | Mueller et al. |
| 6,884,760 B1 | 4/2005 | Brand et al. |
| 9,896,613 B2 | 2/2018 | Muller et al. |
| 10,227,545 B2 | 3/2019 | Maker et al. |
| 10,435,609 B2 | 10/2019 | Maker et al. |
| 2014/0110119 A1* | 4/2014 | Luyster ................. E21B 33/126 166/305.1 |
| 2018/0134949 A1* | 5/2018 | Monastiriotis ........... C09K 8/52 |
| 2022/0340803 A1 | 10/2022 | Eyaa Allogo et al. |

* cited by examiner

*Primary Examiner* — Andrew Sue-Ako
(74) *Attorney, Agent, or Firm* — Thomas Rooney; C. Tumey Law Group PLLC

(57) ABSTRACT

A variety of methods and compositions are disclosed, including, in one example, a method that includes introducing a drill-in fluid into a production zone of a subterranean formation, where the drill-in fluid includes water, a hydrophobically modified starch, a dual oil and water soluble surfactant, and a bridging agent, extending a borehole through the production zone, and forming a filter cake in the production zone where the filter cake includes a plurality of oleophilic channels is formed within the filter cake.

20 Claims, 4 Drawing Sheets

ACTIVE FILTER CAKE COMPONENT FOR RESERVOIR DRILL-IN FLUIDS TO ELIMINATE ACID TREATMENT

BACKGROUND

Natural resources such as gas and oil residing in a subterranean formation or zone are usually recovered by drilling a borehole down to the subterranean formation while circulating a drilling fluid in the borehole. During the drilling operation, drilling fluid, also referred to drilling mud, is conventionally circulated through the borehole as the borehole is drilled. The drilling mud aids in the drilling operation, for example, by removing cuttings from the borehole, providing the borehole with hydrostatic pressure, as well as cooling and lubricating the drill bit.

Drill-in fluid is a special type of drilling fluid specifically used during the final stages of drilling a well, typically when reaching a production zone of a producing formation, or when drilling through unconsolidated or poorly consolidated formations having high permeability production intervals. Drill-in fluids may also be used when drilling through other reservoir sections of a borehole, for example, to minimize damage to the formation while maximizing production. Drill-in fluid often includes solid components which may deposit on the surfaces of the borehole in a layer known as a "filter cake." Filter cake serves to prevent deep filtrate invasion and thus protect the formation from damage, such as from fines, sand, drill cuttings, and other particulates present in the drill-in or wellbore fluids that might otherwise invade the porous matrix of the formation and later interfere with production. In addition, due to its intrinsic resistance to permeation, filter cake helps reduce the amount of fluid loss to the formation by preventing the drill-in fluid from communicating with the formation.

After drilling the borehole, the filter cake is typically removed to allow the flow of formation fluids into the wellbore from the formation. Filter cake removal may include contacting the filter cake with an aqueous acid solution or acid precursor solution to dissolve and break the filter cake. The step of filter cake removal presents additional challenges including that use of aqueous acid solution and acid precursors can be hazardous to personnel and may cause corrosion to acid-susceptible components such as tools and tubulars. Further, filter cake deposits are oftentimes not completely removed thereby resulting in at least some near wellbore formation damage.

BRIEF DESCRIPTION OF THE DRAWINGS

These drawings illustrate certain aspects of some of the embodiments of the present disclosure and should not be used to limit or define the method.

DETAILED DESCRIPTION

Figure 1:
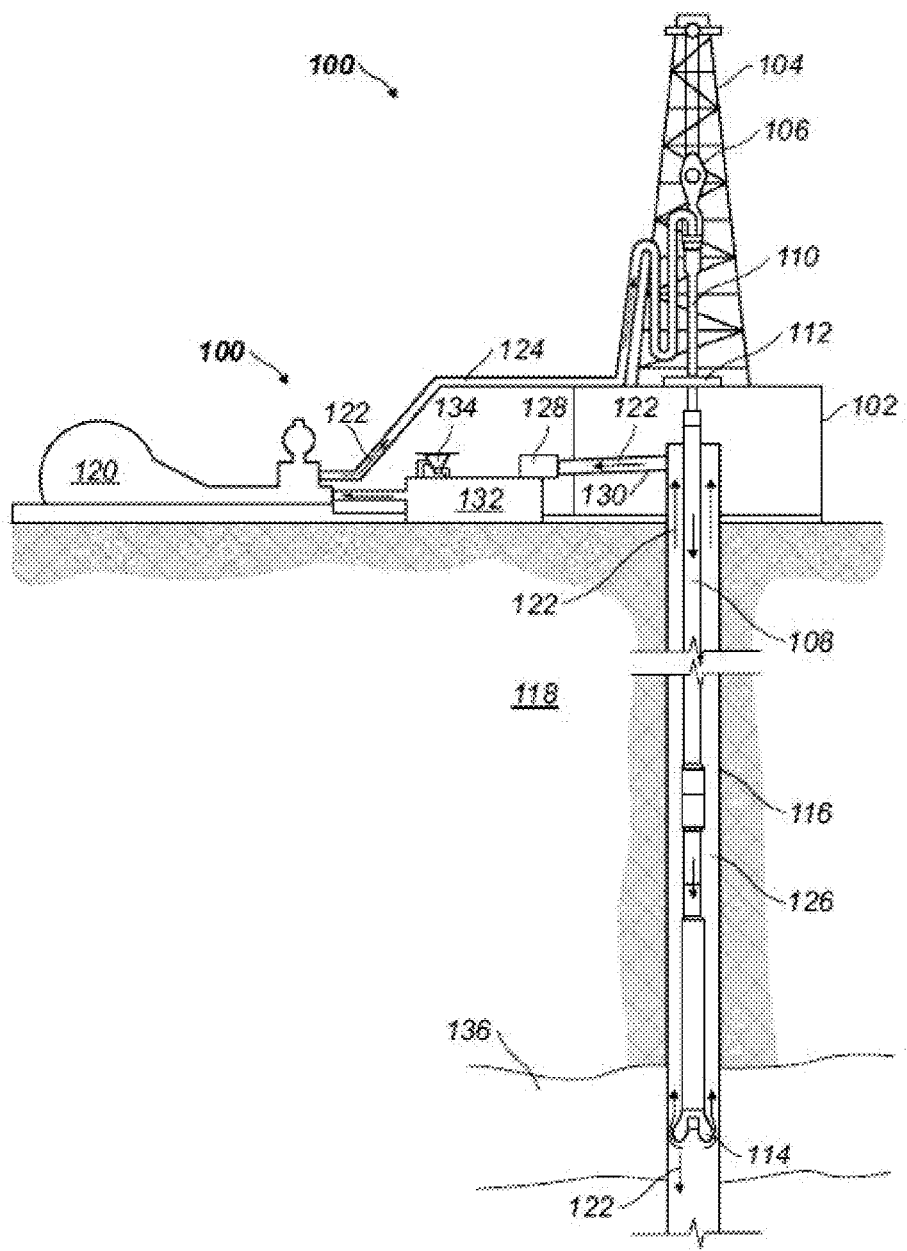
FIG. 1 illustrates a drilling assembly in accordance with some embodiments of the present disclosure.

Disclosed herein are aqueous drill-in fluids comprising an aqueous base fluid, a hydrophobically modified starch, and a surfactant. In some embodiments, the surfactant may include a polyoxyethylene alkyl ether carboxylic acid surfactant and/or an ethoxylated alkyl ether alcohol surfactant. Further disclosed herein are methods of using the drill-in fluid to drill a borehole through a subterranean formation. The drill-in fluids disclosed herein may have several advantages including that the disclosed drill in fluids form a filter cake in the borehole which is substantially less permeable to an aqueous fluid than a hydrocarbon fluid. The filter cake formed is thus permeable to the production of hydrocarbons from the subterranean formation while remaining relatively less permeable to aqueous fluid invasion into the subterranean formation such as when drilling the borehole using the disclosed drill-in fluid. The permeable nature of the filter cake may eliminate or reduce the need for acid treatments to remove the filter cake.

Without being limited by theory, it is believed that the drill-in fluids comprising hydrophobically modified starch and surfactant synergistically work together to form a hydrocarbon permeable filter cake. In the absence of a surfactant there would be free aqueous phase in the filter cake which will resist flow of hydrocarbons due to the surface tension between the hydrocarbon phase and the aqueous phase. However, the selected surfactant has both oil and water soluble properties which allows the hydrophobic starch to disperse into the aqueous phase of the drill-in fluid such that when the filter cake is formed, pores and channels are also formed within the interspatial region of the filter cake. The pores and channels of the filter cake may be relatively hydrophobic owing to the hydrophobic nature of the starch and surfactant such that filter cake has low to no resistance to the flow of hydrocarbon fluid through the filter cake and into the wellbore. The surfactant may have both hydrophilic and oleophilic properties which allows for the hydrophobic starch to be mixed with the aqueous phase of the drill-in fluid and which is believed to aid in the formation of pores and channels in the filter cake. The formation of channels through the filter cake allows formation fluids to flow into the wellbore more readily and may eliminate or reduce the need for acid cleanup treatments since the porous filter cake can reduce water flow into the subterranean formation while still allowing production of hydrocarbon fluids through the filter cake.

The drill-in fluid of the present disclosure may generally comprise an aqueous base fluid, a hydrophobically modified starch, and a surfactant. The drill-in fluid may optionally include additives such as bridging agents, salts, biocides, fluid loss additives, pH buffers, oxygen and/or sulfide scavengers, and viscosifiers, for example. Typically, components of drill-in fluids are selected such that the drill-in fluid presents minimal damage to the formation while maintaining cuttings carrying ability. Solid particles are typically chosen such that the sizes of the particles are effective for bridging and filtration control and salts are typically added to weight the drill-in fluid in lieu of solid weighting agents.

The aqueous base fluid in the drill-in fluid may be non-emulsified, comprising primarily water or brine. Water may be derived from any source including, for example, fresh water, salt water (e.g., water containing Group I and Group II halides such as sodium chloride, calcium chloride, potassium chloride, as well as magnesium chloride, soluble sulfate salts, calcium nitrate, and others), brine, seawater, field water, stream water, groundwater, produced water, industrially treated or brackish water, any combinations thereof, or the like. Water may be present in the drill-in fluid in an amount greater than 60 wt. %, such as from about 60 wt. % to about 99.9 wt. %. Alternatively, from about 60 wt.

% to about 75 wt. %, about 75 wt. % to about 85 wt. %, about 85 wt. % to about 95 wt. %, about 95 wt. % to about 99.9 wt. %, or any ranges therebetween. The drill-in fluid may be weighted by adding a suitable salt such as a Group I and/or Group II halide to have a density suitable for a particular application. By way of example, the drill-in fluid may have a density from about 4 lb/gal (479 kg/m$^3$) to about 20 lb/gal (2396 kg/m$^3$). Alternatively, from about 4 lb/gal (479 kg/m$^3$) to about 8 lb/gal (958 kg/m$^3$), about 8 lb/gal (958 kg/m$^3$) to about 15 lb/gal (1797 kg/m$^3$), about 15 lb/gal (1797 kg/m$^3$) to about 20 lb/gal (2396 kg/m$^3$), or any ranges therebetween.

The drill-in fluid comprises hydrophobically modified starch. Hydrophobically modified starch may act as a filtration control additive and facilitate forming of filter cake on the borehole wall. As used herein, "hydrophobically modified" refers to the incorporation of one or more hydrophobic moieties into a chemical structure to promote repulsion between one or more molecular regions of the starch and water. In examples, the one or more hydrophobic moieties may impart oleophilic properties to the filter cake and promote flow of hydrocarbons through pores disposed therein. Specific examples of hydrophobically modified starches to be used in accordance with the drill-in fluids of the present disclosure may include, for example, various organically modified starches. Other examples include alkyl groups such as methyl, ethyl, and butyl groups. Starch modified by epichlorohydrin, cyanuric chloride, formaldehyde, or combinations thereof. Other examples of hydrophobic modification include aromatic rings; aliphatic chains such as decane, hexadecane, isopentane; fluorinated groups such as trifluoromethyl and pentafluorophenyl groups; alkyl halide groups such as chloromethane and bromobenzene; siloxane groups, long-chain fatty acids such as palmitic acid, stearic acid, and other carboxylic acid groups; and any combinations thereof. The hydrophobically modified starch may be present in the drill-in fluid in any suitable amount, including in a range of from about 2 lb/bbl (5.7 kg/m$^3$) to about 12 lb/bbl (34.2 kg/m$^3$). Alternatively, from about 2 lb/bbl (5.7 kg/m$^3$) to about 6 lb/bbl (17.1 kg/m$^3$), about 6 lb/bbl (17.1 kg/m$^3$) to about 12 lb/bbl (34.2 kg/m$^3$), or any ranges therebetween.

The drill-in fluid comprises a surfactant. Suitable surfactants may include those surfactants which have dual oil and water solubility such as polyoxyethylene alkyl ether carboxylic acid surfactants and/or ethoxylated alkyl ether alcohol surfactants. Other examples of suitable surfactants may include, for example, ether carboxylic emulsifiers such as branched medium chain alkyl ether carboxylic acids, as well as long alkyl chain and long ethoxylated chain ether carboxylic acids. Some specific examples of suitable surfactants include, but are not limited to, oleth-10 carboxylic acid, oleth-6 carboxylic acid, trideceylethoxylate ether carboxylic acid, trideceth-7 carboxylic acid, (2-Butoxyethoxy)acetic acid, sodium butoxyethoxy acetate, polyethyleneglycol lauryl ether, polyethylene glycol hexadecyl ether, polyethylene glycol oleyl ether, polyethylene glycol hexadecyl ether, polyoxyethylene (23) lauryl ether, polyoxyethylene (4) lauryl ether, polyoxyethylene (10) oleyl ether, polyoxyethylene (20) oleyl ether, polyoxyethylene (100) stearyl ether, polyoxyethylene (10) stearyl ether, polyoxyethylene (20) stearyl ether, polyoxyethylene (10) cetyl ether, polyoxyethylene (2) stearyl ether, polyoxyethylene (2) cetyl ether, and combinations thereof. The surfactant may be present in the drill-in fluid in any suitable amount, including in a range of from about 0.1 lb/bbl (0.3 kg/m$^3$) to about 12 lb/bbl (34.2 kg/m$^3$). Alternatively, from about 0.1 lb/bbl (0.3 kg/m$^3$) to about 2 lb/bbl (5.7 kg/m$^3$), about 2 lb/bbl (5.7 kg/m$^3$) to about 6 lb/bbl (17.1 kg/m$^3$), about 6 lb/bbl (17.1 kg/m$^3$) to about 12 lb/bbl (34.2 kg/m$^3$), or any ranges therebetween. The surfactant may be provided as a single phase fluid, a nano-emulsion, and/or a micro emulsion.

The drill-in fluid may further include a bridging agent. A bridging agent may comprise, for example, calcium carbonate. Other examples include, for example, coated calcium carbonate (e.g., coated with steric acid), manganese carbonate, manganese tetraoxide, limonite zinc carbonate, hematite, potassium chloride, sodium chloride, sodium bromide, calcium chloride, calcium bromide, ammonium chloride, zinc bromide, zinc formate, zinc oxide, barium sulfate, lead (II) sulfide, barite (e.g., ultra-fine grind barite, micronized barite, etc.), silica flour, bentonite, cellulose fibers, synthetic fibers, and some types of lost circulation materials (e.g., ground nut shells, mica flakes, synthetic materials, polymeric particles, etc.), etc. The bridging agent may be present in the drill-in fluid in an amount from about a few pounds per barrel (e.g., 5 kg/m$^3$) to several tens of pounds per barrel (e.g., 100 kg/m$^3$), or any ranges therebetween. Alternatively, from about 1 wt. % to about 10 wt. %, about 10 wt. % to about 20 wt. %, about 20 wt. % to about 30 wt. %, about 40 wt. % to about 50 wt. % based on a total weight of the drill-in fluid, or any ranges therebetween. A bridging agent may have a mean particle size from about 1 micron to about 200 microns as defined by ASTM methods, or any ranges therebetween. The bridging agent may be finely dispersed into the colloidal or sub-micron size range. The bridging agent may reinforce the filter cake and enhance its ability to protect the formation from damage and may also assist with fluid loss prevention.

The drill-in fluid may comprise a biopolymer. Suitable biopolymers to be used with the present application may comprise, for example, a starch, xanthan gum, cellulose, guar gum, succinoglycan, polysaccharide, cellulose derivatives such as hydroxyethylcellulose, guar and its derivatives such as hydroxypropyl guar, and any combinations and derivatives thereof. The biopolymer acts as a viscosifier or a fluid loss control additive and modifies the rheology of the drill-in fluid. One or more biopolymers may be individually or collectively present in the drill-in fluid in an amount of about 0.75 lb/bbl (2.1 kg/m$^3$). Alternatively, from about 0.5 lb/bbl (1.4 kg/m$^3$) to about 1 lb/bbl (2.8 kg/m$^3$), about 1 lb/bbl (2.8 kg/m$^3$) to about 2 lb/bbl (5.7 kg/m$^3$), about 2 bl/bbl (5.7 kg/m$^3$) to about 5 lb/bbl (14.2 kg/m$^3$), or any ranges therebetween.

The drill-in fluids may further include additional additives including, for example: a weighting agent; a wetting agent, an inert solid; a fluid loss control agent; a dispersion aid; a corrosion inhibitor; an emulsion thinner; an emulsion thickener; a viscosifying agent; a gelling agent; a particulate; a proppant; a gravel particulate; a lost circulation material; a gas; a pH control additive; a breaker; a biocide; a cross-linker; a chelating agent; a scale inhibitor; a gas hydrate inhibitor; a mutual solvent; an oxidizer; a reducer; a friction reducer; a clay stabilizing agent; a silica scale control additive; a gel stabilizer; an anti-oxidant; a polymer degradation prevention additive; a relative permeability modifier; an iron control agent; a particulate diverter; an acid; a catalyst; a flocculant; a scavenger (e.g., $H_2S$ scavengers, $CO_2$ scavengers or $O_2$ scavengers); a solubilizer; a consolidating agent; a bactericide; and any combinations thereof.

FIG. 1 illustrates a drilling assembly 100 in which a drill-in fluid 122 as disclosed herein may be used. While FIG. 1 generally shows a land-based operation, the principles and teachings herein provided are equally applicable to subsea operations, such as those employing floating or sea-based platforms and rigs, without departing from the scope of the disclosure. As illustrated, drilling assembly 100 may include drilling platform 102 supporting a derrick 104 having a traveling block 106 for raising and lowering a drill string 108. Drill string 108 may include, without limitation, drill pipe and coiled tubing. Kelly 110 may support drill string 108 as it is lowered through a rotary table 112. Drill bit 114 may be attached to a distal end of drill string 108 and may be driven either by a downhole motor (e.g., mud motor) or by rotating drill string 108 from the well surface. Drill bit 114 may include, without limitation, roller cone bits, PDC bits, natural diamond bits, any hole openers, reamers, coring bits, etc. As drill bit 114 rotates, it creates wellbore 116 that penetrates various subterranean formations 118. In an example, drill bit 114 may penetrate reservoir section 136. Pump 120 (e.g., mud pump) may circulate drill-in fluid 122 through feed pipe 124 and to kelly 110, which conveys drill-in fluid 122 downhole through the interior of drill string 108 and through orifices in drill bit 114 and into reservoir section 136. Drill-in fluid 122 may then be circulated back to the surface via an annulus 126 defined between drill string 108 and walls of wellbore 116. In some examples, one or more sections of wellbore 116 may be lined with casing, making wellbore 116 a wellbore. At the surface, recirculated or spent drill-in fluid 122 may exit annulus 126 and be conveyed to one or more fluid processing units 128 via an interconnecting flow line 130. The fluid processing units 128 may include, without limitation, one or more shakers (e.g., shale shakers), a centrifuge, hydrocyclone, separator (including magnetic and electrical separators), desilter, desander, a filter, heat exchanger, and/or any fluid reclamation equipment. Fluid processing units 128 may further include one or more sensors, gauges, pumps, compressors, and the like used to store, monitor, regulate, and/or recondition the drill-in fluid.

After passing through the fluid processing units 128, a "cleaned" drill-in fluid 122 may be deposited into a nearby retention pit 132 (i.e., mud pit). While illustrated as being arranged at the outlet of the wellbore 116 via the annulus 126, fluid processing units 128 may be arranged at any suitable location in the drilling assembly 100. One or more of the drill-in fluid additives may be added to drill-in fluid 122 via a mixing hopper 134 communicably coupled to or otherwise in fluid communication with retention pit 132. Mixing hopper 134 may include, without limitation, mixers, and related mixing equipment. Alternatively, drill-in fluid additives may be added to drill-in fluid 122 at any location in drilling assembly 100. While shown as a single retention pit, retention pit 132 may comprise a plurality of retention pits. Moreover, retention pit 132 may be representative of one or more fluid storage facilities and/or units where drill-in fluid additives may be stored, reconditioned, and/or regulated until added to drill-in fluid 122. During drilling, drill-in fluid 122 may form foam. In examples where foam is present, defoamer may be included or added to drill-in fluid 122 to break foam after a suitable time frame. In another example, a defoamer may prevent formation of foam in drill-in fluid 122.

Figure 2:
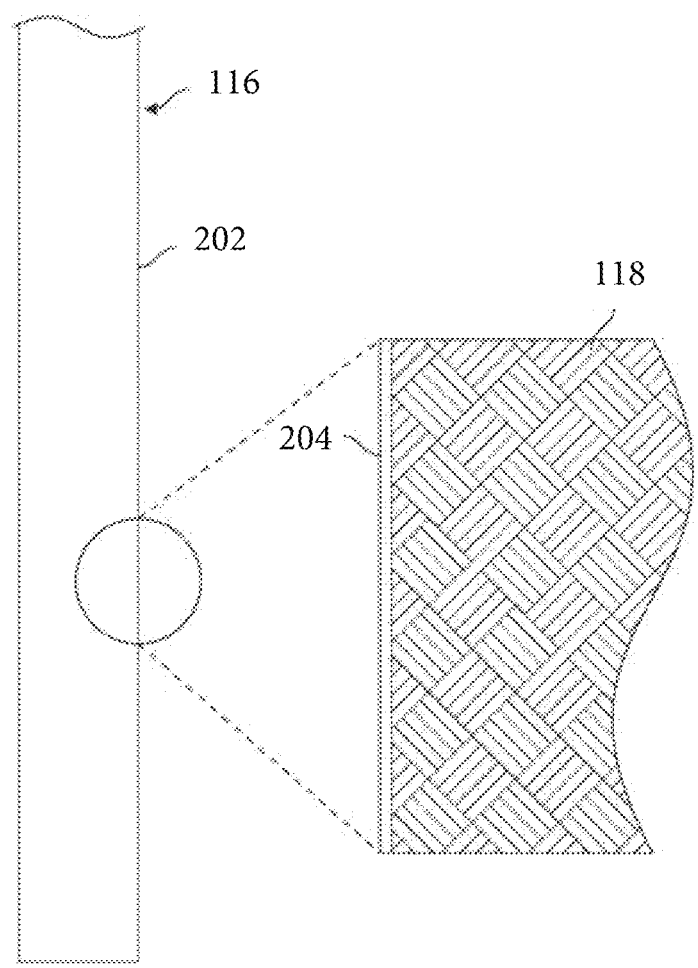
FIG. 2 illustrates a borehole with a filter cake formed on a subterranean formation in accordance with some embodiments of the present disclosure.

FIG. 2 shows a close-up view of wellbore 116 having open hole section 202 in accordance with one or more examples of the present disclosure. As illustrated, the close-up view shows filter cake 204 as a layer on an open hole section 202 of wellbore 116 in subterranean formation 118. Filter cake 204 may form over time upon prolonged exposure of the drill-in fluid to open hole section 202 of wellbore 116.

The drill-in fluids disclosed herein may directly or indirectly affect one or more components or pieces of equipment associated with the preparation, delivery, recapture, recycling, reuse, and/or disposal of the disclosed drill-in fluids. For example, the disclosed drill-in fluids may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary drilling fluids. The disclosed drill-in fluids may also directly or indirectly affect any transport or delivery equipment used to convey the drill-in fluids to a well site or downhole such as, for example, any transport vessels, conduits, pipelines, trucks, tubulars, and/or pipes used to compositionally move the drill-in fluids from one location to another, any pumps, compressors, or motors (e.g., topside or downhole) used to drive the drill-in fluids into motion, any valves or related joints used to regulate the pressure or flow rate of the drill-in fluids, and any sensors (i.e., pressure and temperature), gauges, and/or combinations thereof, and the like. The disclosed drill-in fluids may also directly or indirectly affect the various downhole equipment and tools that may come into contact with the drill-in fluids such as, without limitation, wellbore casing, wellbore liners, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the present disclosure may provide compositions, methods, systems, and apparatuses that may use the disclosed drill-in fluids during drilling operations. The drill-in fluids of the present disclosure may eliminate or reduce the need for acid or delayed acid treatments. The methods, systems, and compositions may include any of the various features disclosed herein, including one or more of the following statements.

Statement 1: A method comprising: introducing a drill-in fluid into a production zone of a subterranean formation, wherein the drill-in fluid comprises: water; a hydrophobically modified starch; a dual oil and water soluble surfactant; and a bridging agent; extending a borehole through the production zone; and forming a filter cake in the production zone wherein the filter cake comprises a plurality of oleophilic channels is formed within the filter cake.

Statement 2: The method of statement 1, wherein the hydrophobically modified starch is modified with at least one moiety selected from the group consisting of epichlorohydrin, cyanuric chloride, formaldehyde, aromatic rings, C1-C20 alkanes, a trifluoromethyl group, a pentafluorophenyl group, a chloromethane group, a bromobenzene group, a siloxane groups, palmitic acid, stearic acid, and combinations thereof.

Statement 3: The method of statements 1 or 2, wherein the dual oil and water soluble surfactant comprises a polyoxyethylene alkyl ether carboxylic acid.

Statement 4: The method of any of statements 1-3, wherein the dual oil and water soluble surfactant comprises an ethoxylated alkyl ether alcohol.

Statement 5: The method of any of statements 1-4, wherein the dual oil and water soluble surfactant comprises at least one surfactant selected from the group consisting of oleth-10 carboxylic acid, oleth-6 carboxylic acid, tridecylethoxylate ether carboxylic acid, trideceth-7 carboxylic acid, (2-Butoxyethoxy)acetic acid, sodium butoxyethoxy acetate, and combinations thereof.

Statement 6: The method of any of statements 1-5, wherein the dual oil and water soluble surfactant comprises at least one surfactant selected from the group consisting of polyethyleneglycol lauryl ether, polyethylene glycol hexadecyl ether, polyethylene glycol oleyl ether, polyethylene glycol hexadecyl ether, polyoxyethylene (23) lauryl ether, polyoxyethylene (4) lauryl ether, polyoxyethylene (10) oleyl ether, polyoxyethylene (20) oleyl ether, polyoxyethylene (100) stearyl ether, polyoxyethylene (10) stearyl ether, polyoxyethylene (20) stearyl ether, polyoxyethylene (10) cetyl ether, polyoxyethylene (2) stearyl ether, polyoxyethylene (2) cetyl ether, and combinations thereof.

Statement 7: The method of any of statements 1-6, wherein the dual oil and water soluble surfactant is included in a microemulsion or a nanoemulsion.

Statement 8: The method of any of statements 1-7, wherein the hydrophobically modified starch is present in the drill-in fluid in an amount from about 5.7 kg/m3 to about 14.3 kg/m3.

Statement 9: The method of any of statements 1-8, wherein the dual oil and water soluble surfactant is present in the drill-in fluid in an amount from about 0.3 kg/m3 to about 14.3 kg/m3.

Statement 10: The method of any of statements 1-9, wherein the drill-in fluid further comprises a Group I or a Group II halide and wherein the drill-in fluid has a density in a range of about 958 kg/m3 to about 1797 kg/m3.

Statement 11: The method of any of statements 1-10, wherein the drill-in fluid further comprises at least one additive selected from the group consisting of: a weighting agent; a wetting agent, an inert solid; a fluid loss control agent; a dispersion aid; a corrosion inhibitor; an emulsion thinner; an emulsion thickener; a viscosifying agent; a gelling agent; a particulate; a proppant; a gravel particulate; a lost circulation material; a gas; a pH control additive; a breaker; a biocide; a crosslinker; a chelating agent; a scale inhibitor; a gas hydrate inhibitor; a mutual solvent; an oxidizer; a reducer; a friction reducer; a clay stabilizing agent; a silica scale control additive; a gel stabilizer; an anti-oxidant; a polymer degradation prevention additive; a relative permeability modifier; an iron control agent; a particulate diverter; an acid; a catalyst; a flocculant; a scavenger; a solubilizer; a consolidating agent; a bactericide; and any combinations thereof.

Statement 12: A drill-in fluid comprising: water; a hydrophobically modified starch; a dual oil and water soluble surfactant; and a bridging agent.

Statement 13: The drill-in fluid of statement 12, wherein the hydrophobically modified starch is modified with at least one moiety selected from the group consisting of epichlorohydrin, cyanuric chloride, formaldehyde, aromatic rings, C1-C20 alkanes, a trifluoromethyl group, a pentafluorophenyl group, a chloromethane group, a bromobenzene group, a siloxane groups, palmitic acid, stearic acid, and combinations thereof.

Statement 14: The drill-in fluid of statements 1 or 3, wherein the dual oil and water soluble surfactant comprises a polyoxyethylene alkyl ether carboxylic acid.

Statement 15: The drill-in fluid of any of statements 12-14, wherein the dual oil and water soluble surfactant comprises an ethoxylated alkyl ether alcohol.

Statement 16: The drill-in fluid of any of statements 12-15, wherein the dual oil and water soluble surfactant comprises at least one surfactant selected from the group consisting of oleth-10 carboxylic acid, oleth-6 carboxylic acid, tridecylethoxylate ether carboxylic acid, trideceth-7 carboxylic acid, (2-Butoxyethoxy)acetic acid, sodium butoxyethoxy acetate, and combinations thereof.

Statement 17: The drill-in fluid of any of statements 12-16, wherein the dual oil and water soluble surfactant comprises at least one surfactant selected from the group consisting of polyethyleneglycol lauryl ether, polyethylene glycol hexadecyl ether, polyethylene glycol oleyl ether, polyethylene glycol hexadecyl ether, polyoxyethylene (23) lauryl ether, polyoxyethylene (4) lauryl ether, polyoxyethylene (10) oleyl ether, polyoxyethylene (20) oleyl ether, polyoxyethylene (100) stearyl ether, polyoxyethylene (10) stearyl ether, polyoxyethylene (20) stearyl ether, polyoxyethylene (10) cetyl ether, polyoxyethylene (2) stearyl ether, polyoxyethylene (2) cetyl ether, and combinations thereof.

Statement 18: The drill-in fluid of any of statements 12-17, wherein the hydrophobically modified starch is present in the drill-in fluid in an amount from about 5.7 kg/m3 to about 14.3 kg/m3.

Statement 19: The drill-in fluid of any of statements 12-18, wherein the dual oil and water soluble surfactant is present in the drill-in fluid in an amount from about 5.7 kg/m3 to about 14.3 kg/m3.

Statement 20: The drill-in fluid of any of statements 12-19, wherein the drill-in fluid further comprises a Group I or a Group II halide and wherein the drill-in fluid has a density in a range of about 958 kg/m3 to about 1797 kg/m3.

To facilitate a better understanding of the present invention, the following examples of certain aspects of some embodiments are given. In no way should the following examples be read to limit, or define, the entire scope of the disclosure.

Example 1

Two drill-in fluids, mix 1 and mix 2, were prepared according to Table 1. Mix 1 was prepared using hydrophobic starch only and mix 2 was prepared with hydrophobic starch and surfactant. After preparing the two drill-in fluids using a multimixer at 11,5000 RPM, the drill-in fluids were dynamically hot rolled at 240° F. (115° C.) for 16 hours. Rheology measurements were taken using a FANN model 35 viscometer before hot rolling (BHR), after hot rolling (AHR), and after static aging (ASA) for 3 days. After static aging, the fluid solids tend to settle down which results in a brine separation in the top layer of the fluid column. The volume of brine separated (ml) in the top layer is also measured. High volume of top layer brine separation, i.e., 150 ml in Mix 1, indicates solids settling is prominent and fluid is not stable enough compared to 30 ml brine separation of Mix 2. The results of the rheology testing and the volume of the top layer brine are shown in Table 2. In addition, High Temperature High Pressure (HTHP) fluid loss (volume, ml) was collected at 30 minutes, at 240° F., and 500 psi differential pressure. The HTHP test was carried out using a HTHP filter paper and using a 10μ, ceramic disc. Volume (ml) was multiplied by 2 as per API and not time. It was observed that the rheology of mix 1 and 2 after hot rolling were similar, but that both the volume of the top layer of brine and the HTHP fluid loss were lower for mix 2.

TABLE 1

| Component | Unit | Mix time (min) | Mix 1 | Mix 2 |
|---|---|---|---|---|
| Water | lb/bbl | 5 | 301 | 301 |
| NaCl | lb/bbl |  | 60 | 60 |
| Viscosifier | lb/bbl | 10 | 0.75 | 0.75 |
| Hydrophobically modified starch | lb/bbl |  | 6 | 6 |
| pH Buffer | lb/bbl | 5 | 0.75 | 0.75 |
| Sized Calcium Carbonate 1 | lb/bbl | 15 | 15 | 15 |
| Sized Calcium Carbonate 2 | lb/bbl |  | 30 | 30 |
| Surfactant | lb/bbl | 5 |  | 3.5 |
| Sulfide Scavenger | lb/bbl | in cell | 0.5 | 0.5 |

TABLE 2

| Rheological Properties | | | | | | |
|---|---|---|---|---|---|---|
|  | Mix 1 | | | Mix 2 | | |
|  | BHR | AHR | ASA, 3d | BHR | AHR | ASA, 3d |
| Shear rate at 600 rpm ($s^{-1}$) | 45 | 44 | 38 | 43 | 53 | 50 |
| Shear rate at 300 rpm ($s^{-1}$) | 32 | 32 | 28 | 30 | 37 | 36 |
| Shear rate at 200 rpm ($s^{-1}$) | 26 | 28 | 24 | 24 | 30 | 29 |
| Shear rate at 100 rpm ($s^{-1}$) | 19 | 23 | 19 | 16 | 21 | 21 |
| Shear rate at 6 rpm ($s^{-1}$) | 6 | 10 | 8 | 5 | 7 | 7 |
| Shear rate at 3 rpm ($s^{-1}$) | 5 | 9 | 6 | 4 | 6 | 5 |
| Plastic Viscosity (cP) | 13 | 12 | 10 | 13 | 16 | 14 |
| Yield Point (lb/100 $ft^2$) | 19 | 20 | 18 | 17 | 21 | 22 |
| 10-sec gel strength (1b/100 $ft^2$) | 6 | 9 | 6 | 5 | 6 | 6 |
| 10-min gel strength (1b/100 $ft^2$) |  | 11 | 9 |  | 9 | 7 |
| Yield Stress at 0 rpm (lb/100 $ft^2$) | 2.33 | 6.52 | 3.89 | 2.05 | 3.50 | 2.35 |
| pH | 9.96 | 9.67 | 9.65 | 10.02 | 9.32 | 9.32 |
| API fluid loss (mL) |  | 3 |  |  | 2.5 |  |
| HTHP, Paper, 240° F., 500 psid, 30 min (mL) |  | 20 |  |  | 10 |  |
| HTHP, 10u Disc, 240° F., 500 psid, 30 min (mL) |  | 15.2 |  |  | 11.2 |  |
| After static aging, 3days, 240° F. Top brine separation (mL) |  |  | 150 |  |  | 30 |

Example 2

Figure 3:
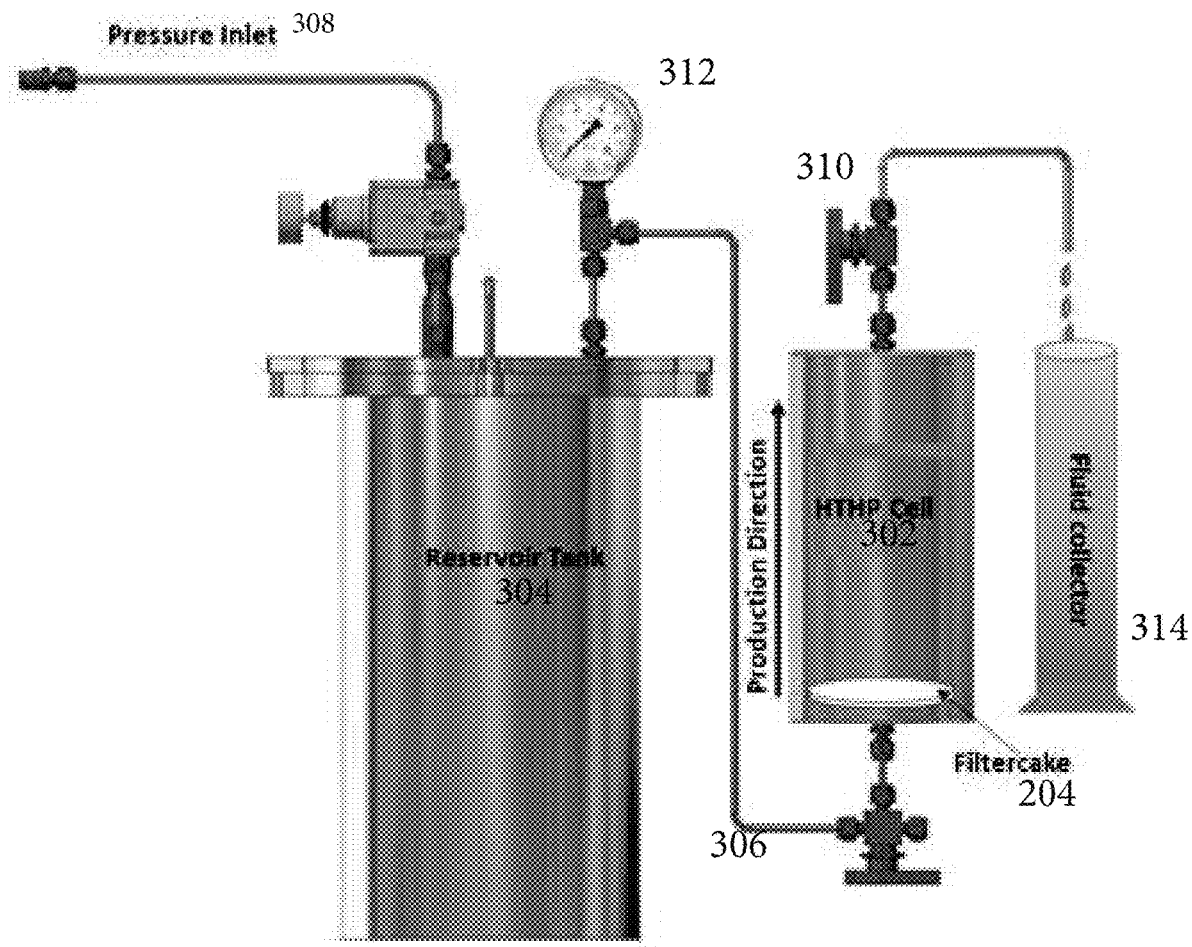
FIG. 3 illustrates an experimental setup for testing the rate of permeation of oil through a filter cake.

FIG. 3 shows an experimental setup 300 for testing the rate of permeation of oil through a filter cake formed by a drill-in fluid. As illustrated, experimental setup 300 comprises a double ended high-temperature high-pressure (HTHP) cell 302 fluidically coupled to reservoir 304 by conduit 306. Filter cake 204 is first allowed to build up over a period of time within double ended HTHP cell 302 during which time it is undisturbed. The formed filter cake 204 inside of double ended HTHP cell 302 is used to simulate a layer of filter cake 204 within wellbore 116 (e.g., referring to FIGS. 1 and 2). Once formed, remnant fluid is removed from double ended HTHP cell 302, and hydrocarbon oil is gently poured into double ended HTHP cell 302. Reservoir 304 containing hydrocarbon oil is pressurized (and may be heated) to simulate subterranean conditions. Digital pressure regulator 312 increases pressure within double ended HTHP cell 302 at a pressure interval until hydrocarbon oil begins to pass from conduit 306 through the formed filter cake 204, into HTHP cell 302, and into fluid collector 314 via a flow metering device 310, simulating migration of hydrocarbon from subterranean formation 118 to a wellbore 116. As a volume of hydrocarbon from enters reservoir 304, an equal amount of hydrocarbon is displaced and forced out into fluid collector 314. The amount of displaced hydrocarbon oil may be measured and recorded to determine the permeability of the formed filter cake to the hydrocarbon oil.

The hot rolled mix 1 and hot rolled mix 2 from Example 1 were subjected to HPHT testing using the HPHT setup of FIG. 3. The HPHT test was performed with a 10 micron disk at 240° F. (115.5° C.) and 500 psig (34.47 bar). Filter cake was allowed to build for 16 hours during the test. The hydrocarbon oil was passed through the cell under a controlled pressure using a digital pressure regulator. The pressure was increased at the interval of 2 psi until the oil started to flow from the top end of cell. The volume of oil was periodically collected and measured versus time. The minimum pressure required to start the oil flow was recorded as filter cake lift off pressure. Filter cake liftoff pressure is the lowest possible pressure and maximum oil flow which would be the best flow conditions for an ideal filter cake.

Figure 4:
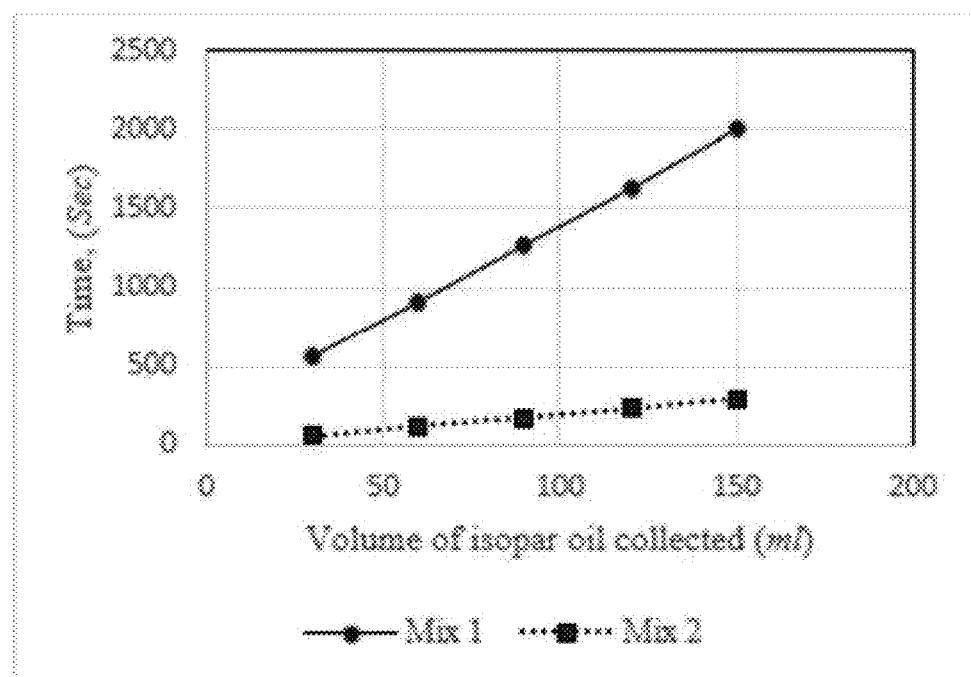
FIG. 4 is a plot showing the total volume of displaced oil with respect to time for two different drill-in fluids used in an experimental setup.

It was observed that the filter cake of mix 1 containing hydrophobic starch had a 15 psi (103.42 kPa) lift off pressure whereas the filter cake of mix 2 containing a surfactant in combination with hydrophobic starch had a 4 psi (27.57 kPa) lift off pressure. The results indicate that there is some amount of resistance for the oil flow through the filter cake of mix 1. The results further indicate that the filter cake of mix 2 showed almost three-fold lesser pressure required to lift off the filter cake or make a channel through the filter cake. Table 3 shows the results of the HPHT test at 15 psi for volume of oil collected at various times. It was observed that oil collected much quicker from the filter cake formed by mix 2. FIG. 4 is a graphical depiction of the volume of oil versus time for the HPHT test. When the filter cakes were removed from the HPHT test cell it was observed that the mix 2 filter cake contained a large number of pores and channels as compared to the filter cake from mix 1.

TABLE 3

| Volume of oil (mL) | Time (sec) | |
| --- | --- | --- |
| | Mix 1 | Mix 2 |
| 30 | 570 | 61 |
| 60 | 910 | 119 |
| 90 | 1265 | 175 |
| 120 | 1630 | 231 |
| 150 | 2005 | 293 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing a drill-in fluid into a production zone of a subterranean formation, wherein the drill-in fluid comprises:
   water;
   a hydrophobically modified starch;
   a dual oil and water soluble surfactant, wherein the dual oil and water soluble surfactant comprises at least one surfactant selected from the group consisting of a polyoxyethylene alkyl ether carboxylic acid, polyethyleneglycol lauryl ether, polyethylene glycol hexadecyl ether, polyethylene glycol oleyl ether, polyethylene glycol hexadecyl ether, polyoxyethylene (23) lauryl ether, polyoxyethylene (4) lauryl ether, polyoxyethylene (10) oleyl ether, polyoxyethylene (20) oleyl ether, polyoxyethylene (100) stearyl ether, polyoxyethylene (10) stearyl ether, polyoxyethylene (20) stearyl ether, polyoxyethylene (10) cetyl ether, polyoxyethylene (2) stearyl ether, polyoxyethylene (2) cetyl ether, and any combination thereof; and
   a bridging agent;
   extending a borehole through the production zone; and
   forming a filter cake in the production zone wherein the filter cake comprises a plurality of oleophilic channels formed within the filter cake.

2. The method of claim 1, wherein the hydrophobically modified starch is modified with at least one moiety selected from the group consisting of epichlorohydrin, cyanuric chloride, formaldehyde, aromatic rings, C1-C20 alkanes, a trifluoromethyl group, a pentafluorophenyl group, a chloromethane group, a bromobenzene group, a siloxane groups, palmitic acid, stearic acid, and combinations thereof.

3. The method of claim 1, wherein the dual oil and water soluble surfactant is included in a microemulsion or a nanoemulsion.

4. The method of claim 1, wherein the hydrophobically modified starch is present in the drill-in fluid in an amount from about 5.7 $kg/m^3$ to about 14.3 $kg/m^3$.

5. The method of claim 1, wherein the dual oil and water soluble surfactant is present in the drill-in fluid in an amount from about 0.3 $kg/m^3$ to about 14.3 $kg/m^3$.

6. The method of claim 1, wherein the drill-in fluid further comprises a Group I or a Group II halide and wherein the drill-in fluid has a density in a range of about 958 $kg/m^3$ to about 1797 $kg/m^3$.

7. The method of claim 1, wherein the drill-in fluid further comprises at least one additive selected from the group consisting of: a weighting agent; a wetting agent, an inert solid; a fluid loss control agent; a dispersion aid; a corrosion inhibitor; an emulsion thinner; an emulsion thickener; a viscosifying agent; a gelling agent; a particulate; a proppant; a gravel particulate; a lost circulation material; a gas; a pH control additive; a breaker; a biocide; a crosslinker; a chelating agent; a scale inhibitor; a gas hydrate inhibitor; a mutual solvent; an oxidizer; a reducer; a friction reducer; a clay stabilizing agent; a silica scale control additive; a gel stabilizer; an anti-oxidant; a polymer degradation prevention additive; a relative permeability modifier; an iron control agent; a particulate diverter; an acid; a catalyst; a flocculant; a scavenger; a solubilizer; a consolidating agent; a bactericide; and any combinations thereof.

8. The method of claim 1, further comprising reducing a flow of water through the plurality of oleophilic channels while still allowing production fluid to flow therethrough.

9. The method of claim 1, wherein the drill-in fluid is non-emulsified and comprises the water or a brine.

10. The method of claim 9, wherein the water or the brine is present in the drill-in fluid in an amount between 60 wt. % and 99.9 wt. %.

11. The method of claim 1, wherein the drill-in fluid has a density between 479 kilograms per cubic meter and 2396 kilograms per cubic meter.

12. The method of claim 1, wherein the drill-in fluid is essentially free of acid and acid precursor, and wherein an API fluid loss of the drill-in fluid after hot rolling is about 2.5 milliliters.

13. The method of claim 1, wherein the bridging agent is present in the drill-in fluid in an amount between 5 kilograms per cubic meter and 100 kilograms per cubic meter.

14. The method of claim 13, wherein the bridging agent has a mean particle size between 1 and 200 microns.

15. The method of claim 13, wherein the bridging agent comprises at least one bridging agent selected from the group consisting of: calcium carbonate; manganese carbonate; manganese tetraoxide; limonite zinc carbonate; hematite; calcium chloride; sodium bromide; calcium bromide; ammonium chloride; zinc bromide; zinc formate; zinc oxide; barium sulfate; lead (II) sulfide; barite; silica flour; bentonite; cellulose fibers; synthetic fibers; and any combination thereof.

16. The method of claim 1, wherein the drill-in fluid further comprises a biopolymer selected from the group consisting of: xanthan gum; cellulose; guar gum; succinoglycan; polysaccharide; a cellulose derivative; hydroxypropyl guar; and any combination thereof, wherein the biopolymer is present in the drill-in fluid in an amount between 1.4 kilograms per cubic meter and 14.2 kilograms per cubic meter.

17. A method comprising:
   introducing a drill-in fluid into a production zone of a subterranean formation, wherein the drill-in fluid comprises:
      water;
      a hydrophobically modified starch;
      a dual oil and water soluble surfactant, wherein the dual oil and water soluble surfactant comprises at least one surfactant selected from the group consisting of oleth-10 carboxylic acid, oleth-6 carboxylic acid, tridecylethoxylate ether carboxylic acid, trideceth-7 carboxylic acid, (2-Butoxyethoxy)acetic acid, sodium butoxyethoxy acetate, and combinations thereof; and
      a bridging agent;
   extending a borehole through the production zone; and
   forming a filter cake in the production zone wherein the filter cake comprises a plurality of oleophilic channels formed within the filter cake.

18. The method of claim 17, wherein the dual oil and water soluble surfactant is included in a microemulsion or a nanoemulsion, wherein the hydrophobically modified starch is present in the drill-in fluid in an amount from about 5.7 kg/m$^3$ to about 14.3 kg/m$^3$, and wherein the dual oil and water soluble surfactant is present in the drill-in fluid in an amount from about 0.3 kg/m$^3$ to about 14.3 kg/m$^3$.

19. A method comprising:
   introducing a drill-in fluid into a production zone of a subterranean formation, wherein the drill-in fluid comprises:
      water;
      a hydrophobically modified starch;
      a dual oil and water soluble surfactant wherein the dual oil and water soluble surfactant comprises a polyoxyethylene alkyl ether carboxylic acid; and
      a bridging agent;
   extending a borehole through the production zone; and
   forming a filter cake in the production zone wherein the filter cake comprises a plurality of oleophilic channels formed within the filter cake.

20. The method of claim 19, wherein the dual oil and water soluble surfactant is included in a microemulsion or a nanoemulsion, wherein the hydrophobically modified starch is present in the drill-in fluid in an amount from about 5.7 kg/m$^3$ to about 14.3 kg/m$^3$, and wherein the dual oil and water soluble surfactant is present in the drill-in fluid in an amount from about 0.3 kg/m$^3$ to about 14.3 kg/m$^3$.

* * * * *